April 8, 1958

C. E. DREW ET AL 2,829,899

WORK HOLDING SLEEVE MEMBER

Filed Nov. 18, 1954

INVENTORS
Charles E. Drew
BY John T. Cochran

Louis O. French
Atty.

April 8, 1958

C. E. DREW ET AL 2,829,899

WORK HOLDING SLEEVE MEMBER

Filed Nov. 18, 1954

INVENTORS
Charles E. Drew
John T. Cochran
BY
Louis O. French
Atty.

United States Patent Office 2,829,899
Patented Apr. 8, 1958

2,829,899

WORK HOLDING SLEEVE MEMBER

Charles E. Drew, Racine, Wis., and John T. Cochran, Rochester, Mich., assignors to Drewco Corporation, Racine, Wis., a corporation of Wisconsin Application November 18, 1954, Serial No. 469,612

2 Claims. (Cl. 279—41)

The invention relates to expanding or contractible work holding sleeve members such as expanding mandrels or collet chucks.

Sleeve members of the type above defined are provided with a series of lengthwise slots extending inwardly from one end or from opposite ends to permit expansion or contraction of the sleeve into contact with the work through pressure applied to the end or ends of the sleeve. The main object of the invention is to provide such sleeve members with a firmly anchored yieldable filler for the lengthwise extending slots to prevent chips or dirt from getting into these slots and thereby spoiling the accuracy and gripping power of these members since any foreign matter in these slots interferes with the contraction and expansion of such members.

A further object of the invention is to provide a work holding sleeve member of the expansible or contractible type with a wiper for the end or ends of such sleeve member of similar material to that of the filler to further prevent chips or foreign matter getting between the gripping surfaces of the sleeve and the work to be held and thereby spoiling the fitting accuracy of the sleeve and its gripping power.

The invention further consists in the several features hereinafter described and more particularly defined by claims at the conclusion hereof.

Figure 1:
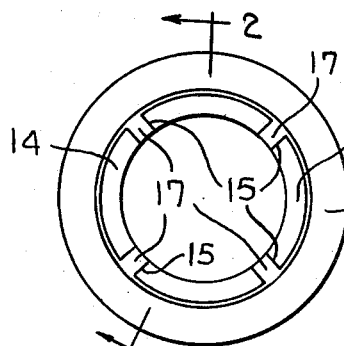
Fig. 1 is an end elevation view of one form of expansible work holding sleeve member.
Figure 2:
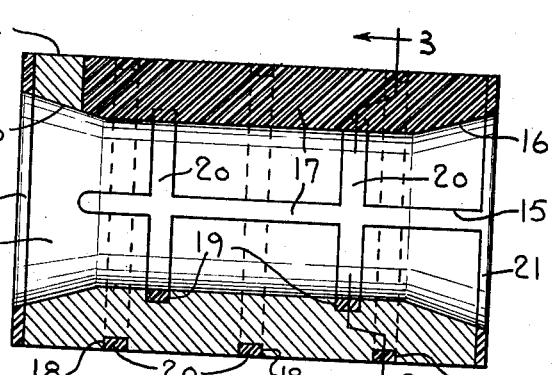
Fig. 2 is a vertical sectional view taken on the broken line 2—2 of Fig. 1.
Figure 3:
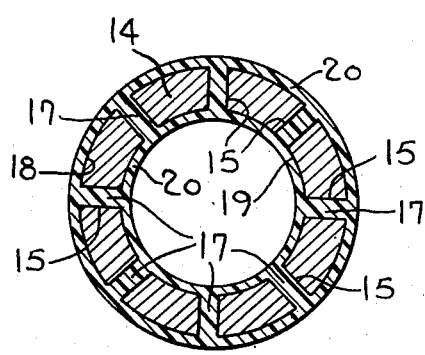
Fig. 3 is a vertical sectional view taken on the broken line 3—3 of Fig. 2.

Referring to Figs. 1 to 3 and 12 of the drawings, we have shown a resilient metal sleeve member 14 adapted to be expanded to have its exterior surface engage with the bore of the work to be held, such member or tool being commonly known as an expanding mandrel. In common with such mandrels the member 14 has lengthwise extending slots 15 extending inwardly from its opposite ends. The slots 15 extending inwardly from each end are equidistantly circumferentially spaced relative to each other, and the series of slots from one end are equidistantly circumferentially offset from the series of slots from the other end. The ends of the member 14 are provided with outwardly flaring or tapered bores 16 so that when parts of the supporting and centering means for the sleeve are brought into contacting relation with these bores, the sleeve will be expanded against the bore of the work to be held.

The slots 15 present openings into which dirt and chips from the work can enter and thus prevent the desired contraction and expansion of the sleeve, and to prevent this occurring, these slots are filled with a yieldable filler material 17 which may be a suitable yieldable plastic composition which will not be attacked by oils, greases, or coolants that may be used in connection with operations on the work held by the sleeve. Synthetic rubber or rubber-like plastics are suitable for the filler material. To firmly hold the filler in place, we have provided a series of annular grooves 18 extending inwardly from the outer surface of the sleeve member and a series of annular grooves 19 extending outwardly from the inner bore of the sleeve member, said grooves 18 and 19 being filled with yieldable material 20, similar to the material 17, that forms a series of inner and outer holding bands for the filler material 17.

Also at the ends of the sleeve member 14 layers 21 of yieldable material are secured to said member, as by molding it in place, these layers also forming wipers and end bands connecting with the filler material in the slots 15 and being of the same kind as the material 17 or of a kind compatible with or bondable to said material 17.

Figure 4:
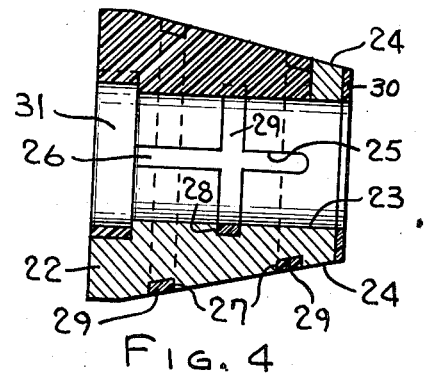
Fig. 4 is a vertical sectional view of another form of work holding sleeve member, the section being taken on the broken line 4—4 of Fig. 5.
Figure 5:
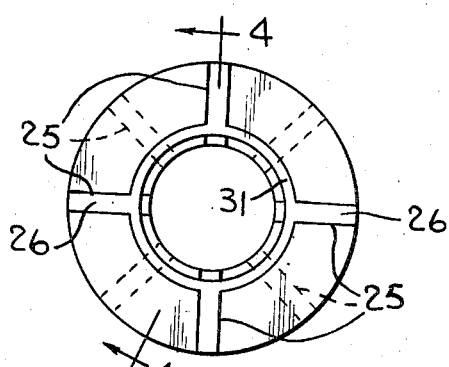
Fig. 5 is a rear end view of the sleeve member shown in Fig. 4.
Figure 6:
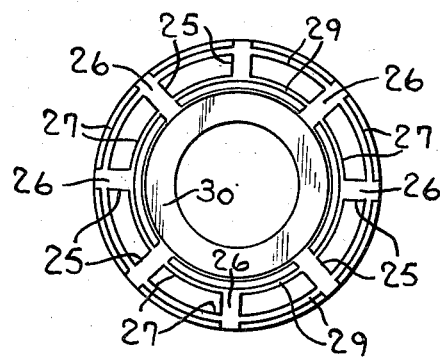
Fig. 6 is a front end view of the sleeve member shown in Fig. 4.

In Figs. 4 to 6 we have shown a resilient metal sleeve member 22 adapted to be expanded to have its interior bore 23 engage the outer surface of work to be held and having a conical outer surface 24 to be engaged by a suitable fixture to contract said member into holding contact with the work, such member or tool being commonly known as a collet chuck. In common with such chucks, the member 22 has lengthwise extending slots 25 extending inwardly from its opposite ends. The slots 25 extending inwardly from each end are equidistantly circumferentially spaced relative to each other, and the series of slots from one end are equidistantly circumferentially offset from the series of slots from the other end.

As in the first form, the slots 25 are filled with a yieldable filler material 26 such as previously described, and as in the first described form annular grooves 27 and one or more annular grooves 28 are formed in the member 22 and filled with filler material 29 similar to the material 26 or compatible and cooperating therewith to form a series of holding bands. This sleeve also has an end wiper layer of yieldable material 30 and a sleeve layer 31 of similar material.

Figure 7:
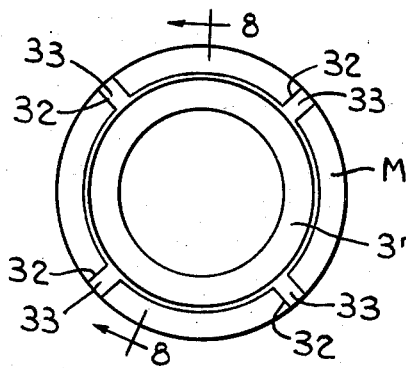
Fig. 7 is an end elevation view of a modified form of sleeve member from that of Fig. 1.
Figure 8:
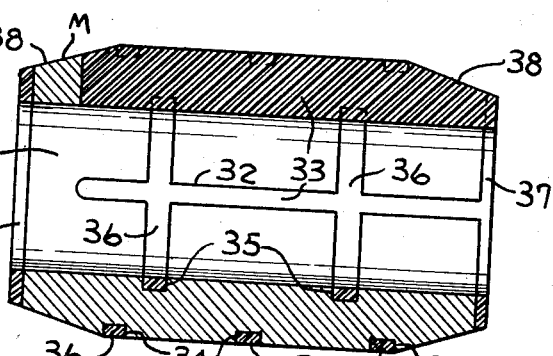
Fig. 8 is a vertical sectional view taken on the broken line 8—8 of Fig. 7.

In Figs. 7 and 8 we have shown a sleeve mandrel M of the contractible type having slots 32 similar to the slots 15 having the yieldable filler material 33 therein, which similar to the first described form has annular grooves 34 and 35 to receive filler material 36 cooperating with the filler 33 and also having end wiper layers 37 similar to the layers 21 of the first form. In this form of sleeve tapered end surfaces 38 are provided for engagement with suitable fixtures to contract the sleeve into holding engagement with the work.

Figure 9:
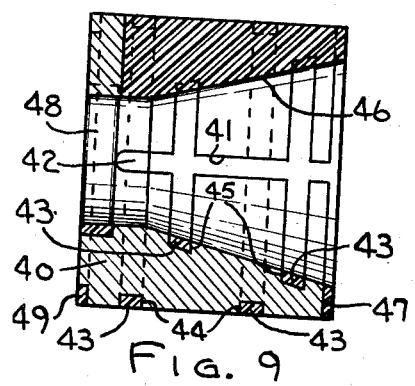
Fig. 9 is a vertical sectional view of another form of work holding sleeve member, the section being taken on the broken line 9—9 of Fig. 10.
Figure 12:
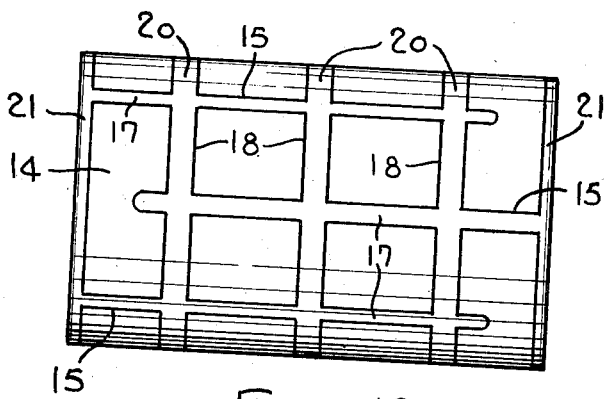
Fig. 12 is a plan view of the sleeve member shown in Fig. 1.
Figure 10:
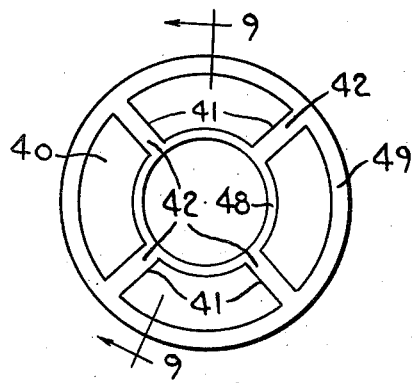
Fig. 10 is a rear end view of the sleeve member shown in Fig. 9.
Figure 11:
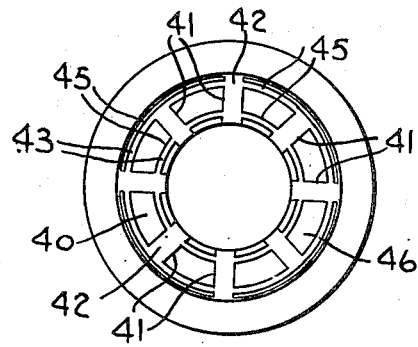
Fig. 11 is a front end view of the sleeve member shown in Fig. 9.

In Figs. 9 to 11 we have shown a work holding expansible sleeve member 40 which has slots 41 similar to the slots 15 filled with yieldable filler material 42 with holding bands of similar or compatible material 43 molded into the annular grooves 44 and 45 in the surfaces of said member. In this form the sleeve is of the expanding type with a large internal tapered bore 46 for receiving a suitable fixture to expand the outer surface of the sleeve into contact with the work. The sleeve has an end wiper layer 47 of yieldable material and cylindrical wiper inserts 48 and 49 of similar material.

In all of the forms above described it is to be noted that the slots in the sleeve that permit its expansion or contraction are filled with a yieldable filler material that excludes the entry of dirt or chips into the spaces formed by these slots which in the usual open slot devices frequently interfere with the proper contraction or expansion of the sleeve and thus spoil its accuracy and gripping power and that the end wiper or wipers prevent foreign matter from lodging on the gripping surface or fixture contacting surface or surfaces of the tool that might interfere with its accuracy and gripping power.

We desire it to be understood that this invention is not to be limited to any particular form or arrangement of parts except in so far as such limitations are included in the claims.

What we claim as our invention is:

1. In a tool of the character described, the combination of a contractible or expansible work holding metal sleeve member having lengthwise extending circumferentially spaced slots extending inwardly from an end of said member, yieldable filler material for said slots to exclude foreign matter therefrom, grooves in the inner and outer surfaces of said member intersecting said slots, and yieldable material inset in said grooves and bonded to the filler material in said slots, the spacing of the grooves in the inner surface being staggered relative to the grooves in the outer surface, and a layer of yieldable material bonded to the filler material in the slots at one end of said member and forming an end wiper extending from the inner bore of said sleeve to the outer side thereof.

2. In a tool of the character described, the combination of a contractible or expansible work holding metal sleeve member having lengthwise extending circumferentially spaced slots extending inwardly from an end of said member, yieldable filler material for said slots to exclude foreign matter therefrom, grooves in the inner and outer surfaces of said member intersecting said slots, and yieldable material inset in said grooves and bonded to the filler material in said slots, the spacing of the grooves in the inner surface being staggered relative to the grooves in the outer surface.

References Cited in the file of this patent

UNITED STATES PATENTS

| | | |
|---|---|---|
| 1,007,132 | Miller | Oct. 31, 1911 |
| 2,012,826 | Montgomery | Aug. 27, 1935 |
| 2,346,706 | Stoner | Apr. 18, 1944 |
| 2,374,245 | Stoner | Apr. 24, 1945 |
| 2,452,184 | Cole | Oct. 26, 1948 |

FOREIGN PATENTS

| | | |
|---|---|---|
| 482,766 | Great Britain | Apr. 5, 1938 |